US012643217B2

(12) United States Patent
Barke

(10) Patent No.: US 12,643,217 B2
(45) Date of Patent: Jun. 2, 2026

(54) WRENCH EXTENSION APPARATUS

(71) Applicant: Craig Barke, Roseburg, OR (US)

(72) Inventor: Craig Barke, Roseburg, OR (US)

( * ) Notice: Subject to any disclaimer, the term of this patent is extended or adjusted under 35 U.S.C. 154(b) by 353 days.

(21) Appl. No.: 18/234,451

(22) Filed: Aug. 16, 2023

(65) Prior Publication Data

US 2024/0208033 A1 Jun. 27, 2024

Related U.S. Application Data

(63) Continuation-in-part of application No. 18/085,956, filed on Dec. 21, 2022, now Pat. No. 12,337,460.

(51) Int. Cl.
*B25G 1/04* (2006.01)
*B25G 3/02* (2006.01)

(52) U.S. Cl.
CPC ............... *B25G 1/043* (2013.01); *B25G 3/02* (2013.01)

(58) Field of Classification Search
CPC ... B25G 3/02; B25G 3/08; B25G 3/20; B25G 3/24; B25G 3/28; B25G 1/005; B25G 1/043; B25G 1/04; B25G 1/10; E05B 1/0053; B66F 19/00; B25B 13/02; B25B 13/04; B25B 13/06; B25B 13/08; B25B 13/56; B25B 13/481; B25B 23/0021; B25B 23/0035; B25B 23/16
USPC ............... D8/14, 21, 22, 27, 51, 88, 89, 107
See application file for complete search history.

(56) References Cited

U.S. PATENT DOCUMENTS 1,775,402 A 9/1930 Mandl
4,655,492 A * 4/1987 Landry .................... B65G 7/12 294/92
4,709,602 A 12/1987 Grabovac
4,811,637 A * 3/1989 McCleary ............... B25B 23/16 81/177.2
6,938,522 B1 * 9/2005 Stannik .................. H01R 43/26 81/124.2
7,070,218 B2 * 7/2006 Bercaw .................... B65G 7/12 294/92
7,789,369 B2 * 9/2010 Jahnz .................... B60R 13/005 224/571
7,971,914 B1 * 7/2011 Pladson ................. A01B 1/026 294/58
8,402,864 B1 * 3/2013 Stephens ................. B25B 23/18 81/177.2
8,893,355 B2 * 11/2014 Longley ................... B25G 1/00 294/58
8,931,376 B2 * 1/2015 Humphrey ............. B25G 1/005 81/177.2
9,193,058 B2 * 11/2015 Gallegos ............... B25B 15/008
9,387,579 B2 * 7/2016 Johnson ................... B25G 3/28
9,604,349 B2 * 3/2017 Johnson ................ B25B 13/463
(Continued)

FOREIGN PATENT DOCUMENTS

CN 1017904438 7/2010

*Primary Examiner* — David B. Thomas

(57) ABSTRACT

A wrench extension apparatus for extending an effective length of a wrench to provide greater leverage when operating the wrench includes an elongated member with a channel therein for holding the wrench. The wrench is insertable by inserting a central portion of the wrench into a side opening of the elongated member and twisting the wrench into an operation position. The insertion of the wrench may be performed in two discrete steps rather than by simultaneously inserting and twisting the wrench into the operation position.

13 Claims, 9 Drawing Sheets

(56) References Cited

U.S. PATENT DOCUMENTS

| | | | | |
|---|---|---|---|---|
| 9,649,760 | B2 | 5/2017 | Klimsza | |
| 9,752,348 | B2 * | 9/2017 | Leach | E05B 1/0053 |
| 10,207,400 | B2 * | 2/2019 | Gallegos | B25G 3/24 |
| 10,611,014 | B2 * | 4/2020 | Lazarov | B25G 1/043 |
| 11,103,985 | B2 * | 8/2021 | Tsai | B25G 1/005 |
| 2006/0070499 | A1 * | 4/2006 | Brooks | B25G 1/043<br>81/184 |
| 2012/0174718 | A1 | 7/2012 | James | |
| 2013/0098211 | A1 * | 4/2013 | Sampson, Sr. | B25G 1/005<br>81/177.2 |
| 2017/0320208 | A1 * | 11/2017 | Culkin | B25G 1/005 |

* cited by examiner

WRENCH EXTENSION APPARATUS

CROSS-REFERENCE TO RELATED APPLICATIONS

I hereby claim the benefit under 35 U.S.C., Section 120 of U.S. application Ser. No. 18/085,956 filed Dec. 21, 2022.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to extension apparatuses and more particularly pertains to a new extension apparatus for extending an effective length of a wrench to provide greater leverage when operating the wrench.

(2) Description of Related Art Including Information Disclosed Under 37 CFR 1.97 and 1.98

The prior art discloses various means of extending a grip for a wrench to improve the leverage of the same. However, the prior art fails to describe an apparatus that receives a wrench into a channel by inserting the wrench sideways into the channel and then twisting the wrench into an operation position.

BRIEF SUMMARY OF THE INVENTION

An embodiment of the disclosure meets the needs presented above by generally comprising an elongated member with a first end and a second end. The elongated member defines a channel therein which is open on the first end and has a size for partially containing a wrench. The elongated member has an opening with a size such that the opening is may receive the wrench into the channel. The opening has a first end portion, a second end portion, and a central portion. The first end portion of the opening extends from the first end of the elongated member toward the second end of the elongated member along a first side of the elongated member. The central portion of the opening extends from the first end portion around the elongated member to a second side of the elongated member opposite the first side. The second end portion of the opening extends from the central portion toward the second end of the elongated member. The opening is shaped to facilitate insertion of a central section of the wrench through the central portion of the opening and thereafter facilitate insertion of opposing end sections of the wrench through respective ones of the first end portion and the second end portion of the opening.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
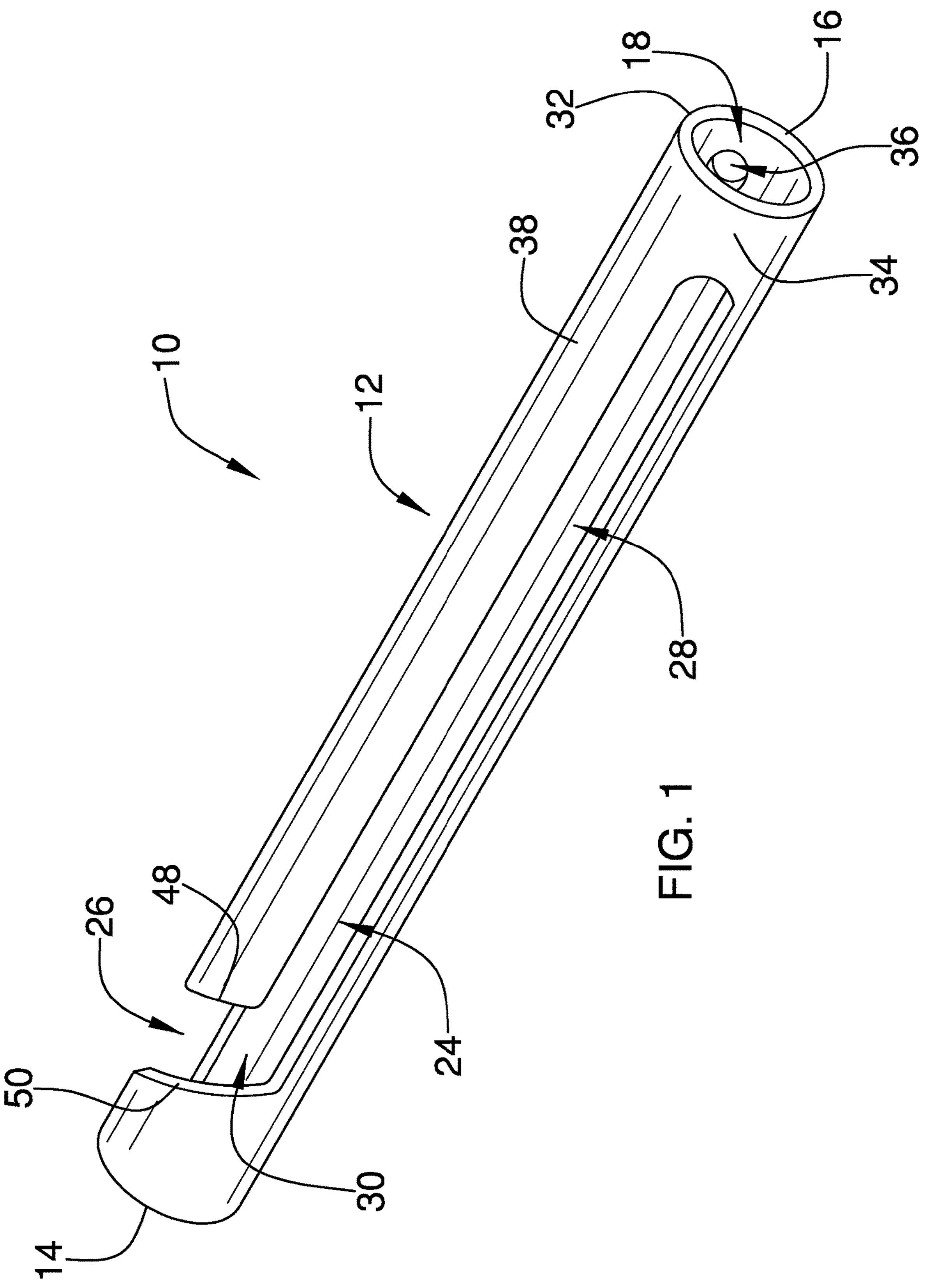
FIG. 1 is a bottom perspective view of a wrench extension apparatus according to an embodiment of the disclosure.
Figure 2:
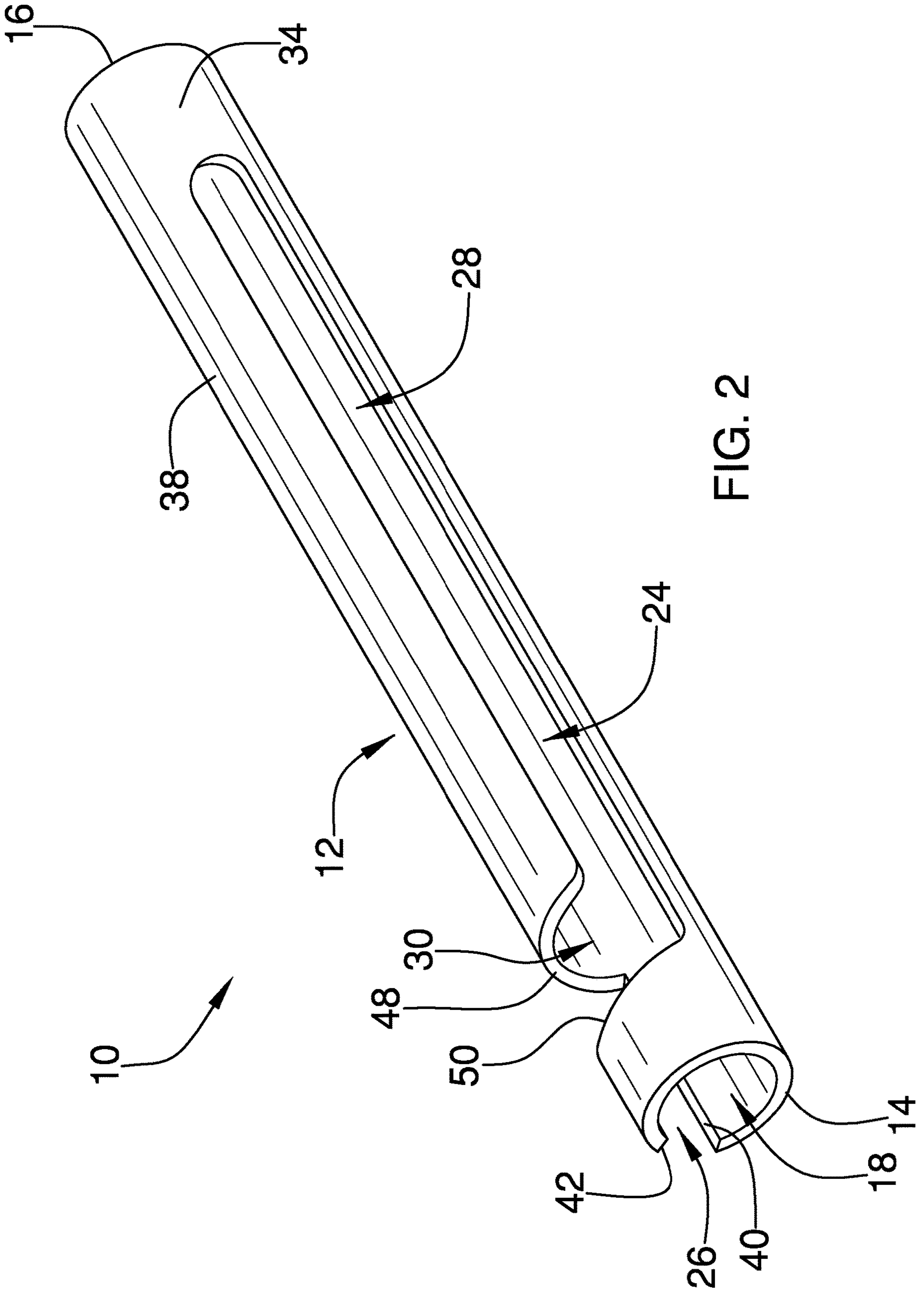
FIG. 2 is a top perspective view of an embodiment of the disclosure.
Figure 3:
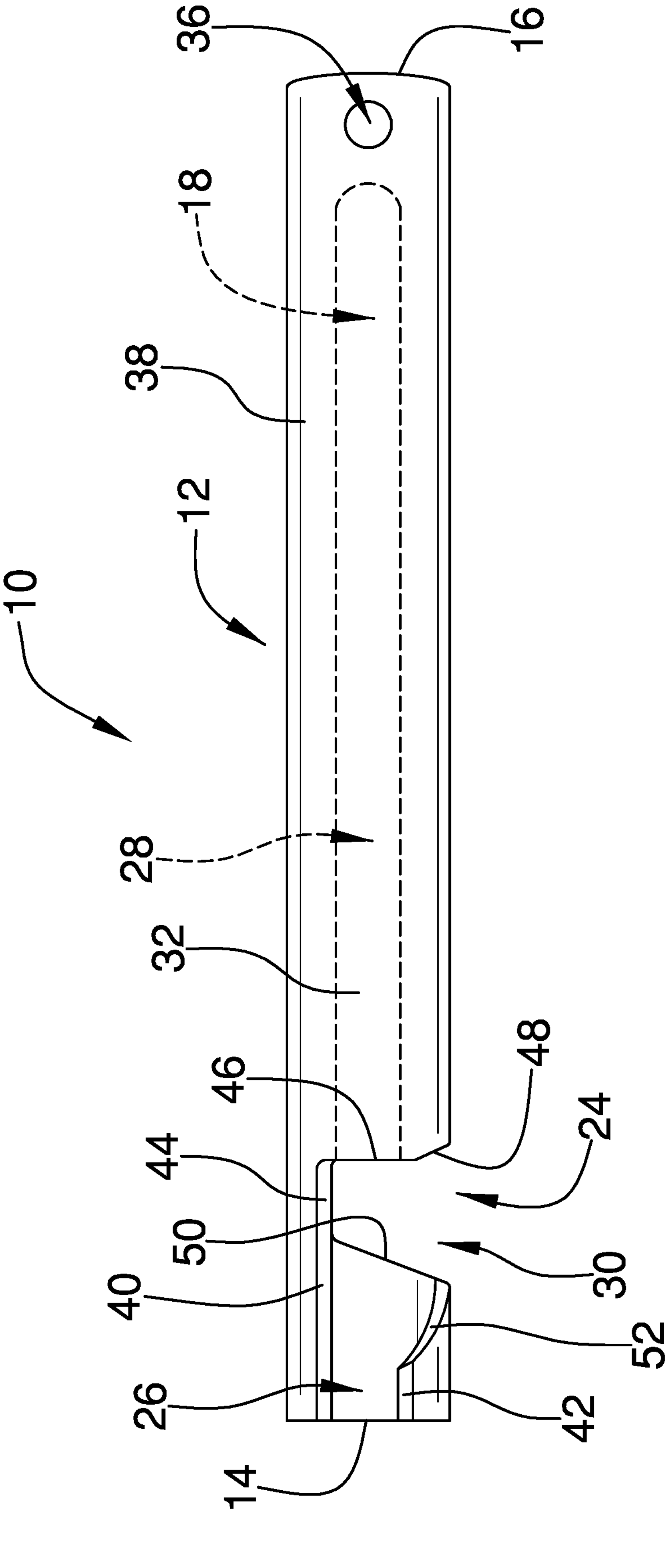
FIG. 3 is a rear view of an embodiment of the disclosure.
Figure 4:
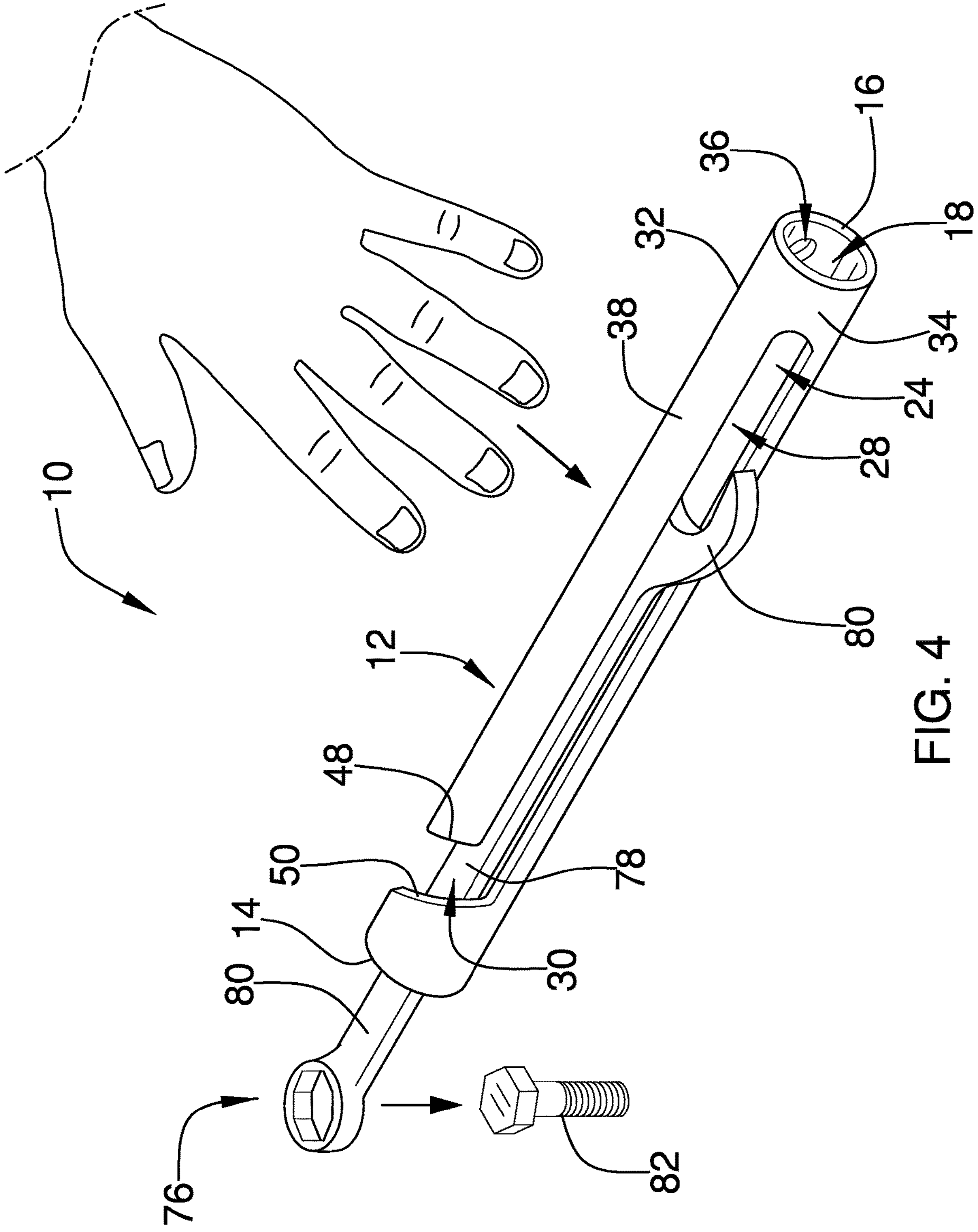
FIG. 4 is a perspective in-use view of an embodiment of the disclosure.
Figure 5:
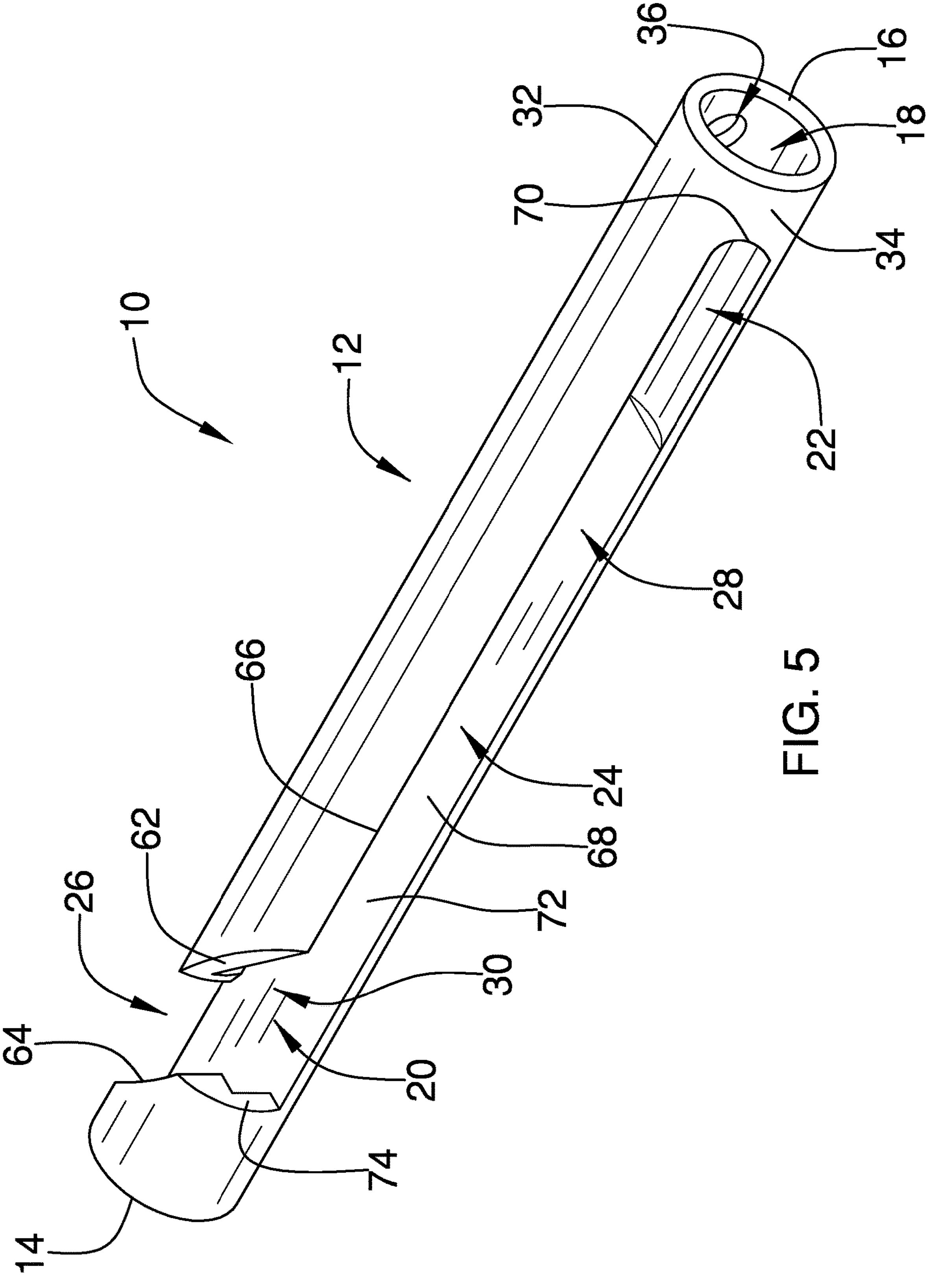
FIG. 5 is a bottom perspective view of an embodiment of the disclosure.
Figure 6:
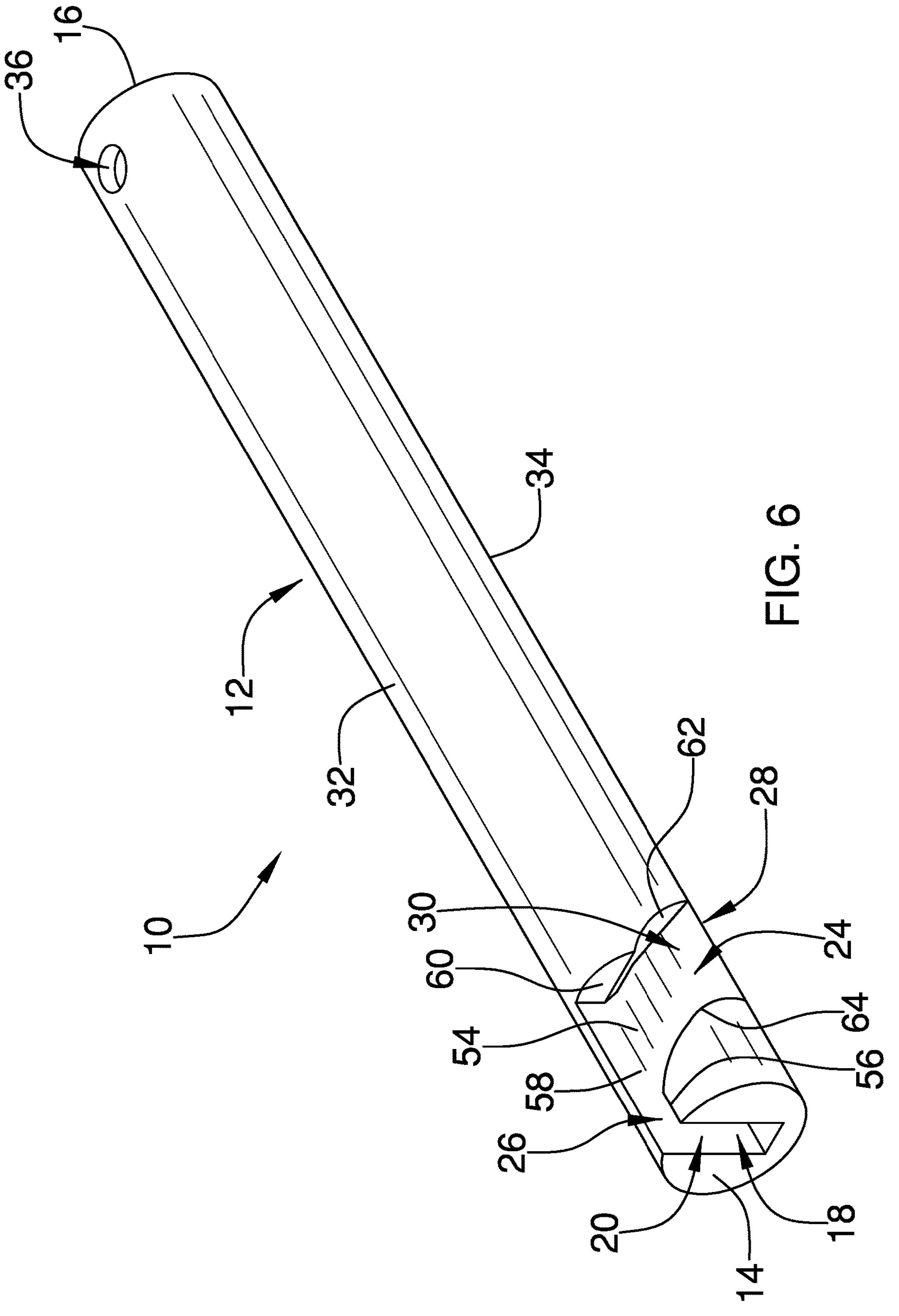
FIG. 6 is a top perspective view of an embodiment of the disclosure.
Figure 7:
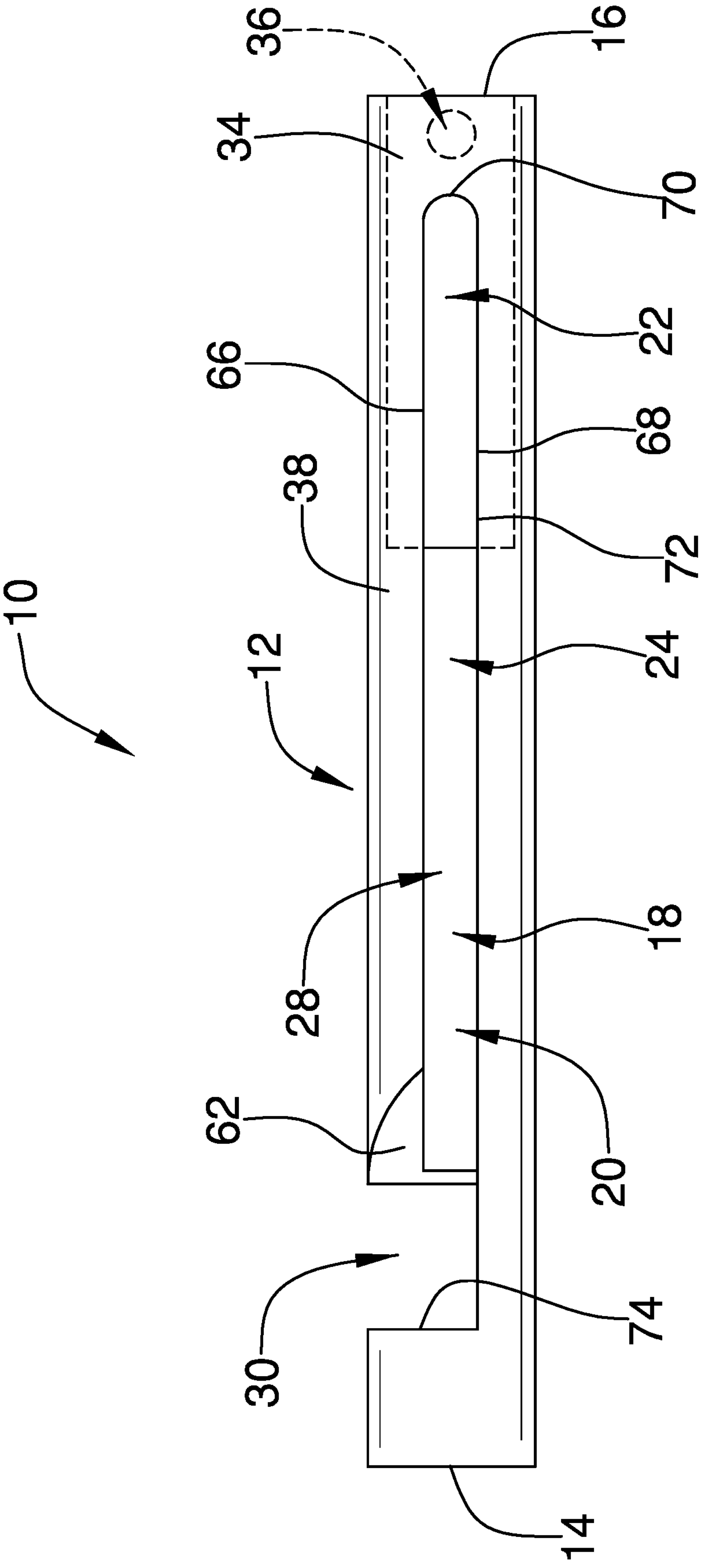
FIG. 7 is a front view of an embodiment of the disclosure.
Figure 8:
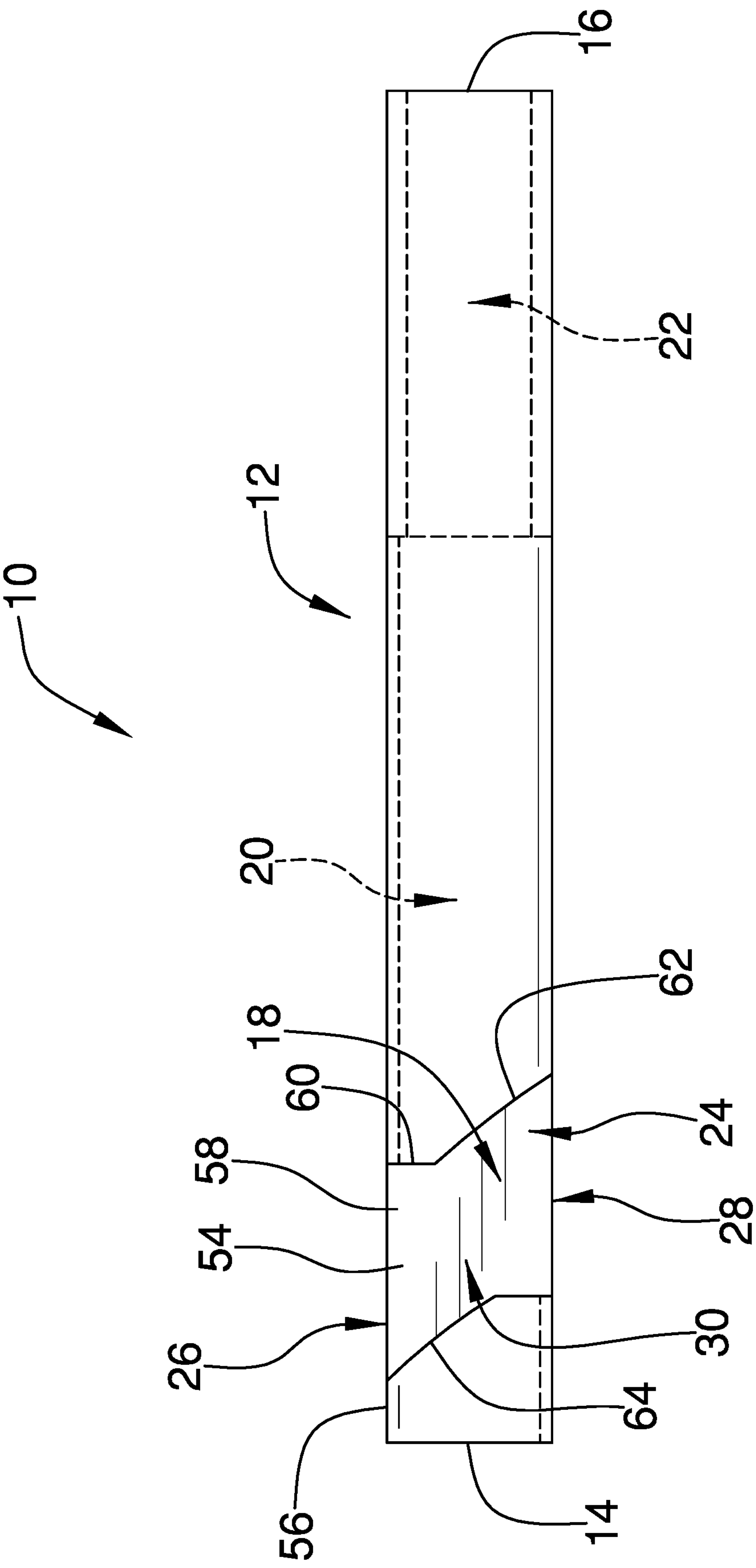
FIG. 8 is a side view of an embodiment of the disclosure.
Figure 9:
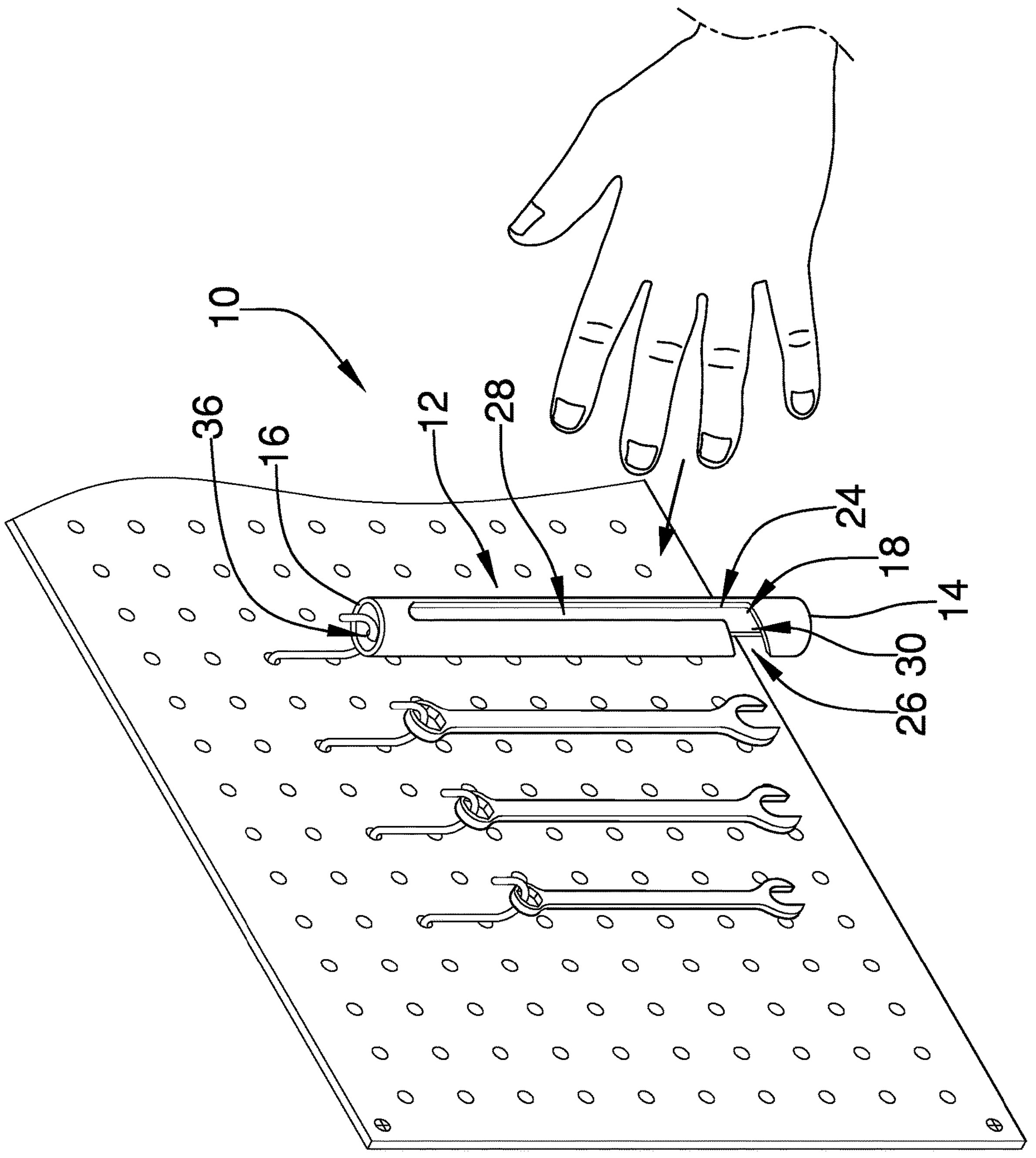
FIG. 9 is a perspective in-use view of an embodiment of the disclosure.

With reference now to the drawings, and in particular to FIGS. 1 through 9 thereof, a new extension apparatus embodying the principles and concepts of an embodiment of the disclosure and generally designated by the reference numeral 10 will be described.

As best illustrated in FIGS. 1 through 9, the wrench extension apparatus 10 generally comprises an elongated member 12 with a first end 14 and a second end 16. The elongated member 12 defines a channel 18 therein which is open on the first end 14 and the second end 16 of the elongated member 12. The channel 18 has a size such that the channel 18 is configured for partially containing a wrench 76. The elongated member 12 has an opening 24 with a size such that the opening 24 is configured for receiving the wrench 76 into the channel 18.

The opening 24 has a first end portion 26, a second end portion 28, and a central portion 30. The first end portion 26 of the opening 24 extends from the first end 14 of the elongated member 12 toward the second end 16 of the elongated member 12 along a first side 32 of the elongated member 12. The central portion 30 of the opening 24 extends from the first end portion 26 around the elongated member 12 to a second side 34 of the elongated member 12 opposite the first side 32. The second end portion 28 of the opening 24 extends from the central portion 30 toward the second end 16 of the elongated member 12. The central portion 30 is oriented to form an acute angle with a central longitudinal axis of the elongated member 12. The opening 24 is shaped such that the opening 24 is configured to facilitate insertion of a central section 78 of the wrench 76 through the central portion 30 of the opening 24 and thereafter facilitate insertion of opposing end sections 80 of the wrench 76 through respective ones of the first end portion 26 and the second end portion 28 of the opening 24.

The central portion 30 of the opening 24 is positioned closer to the first end 14 of the elongated member 12 than the second end 16, and the second end portion 28 of the opening 24 is longer than the first end portion 26. The elongated member 12 also has a mounting hole 36 extending into the elongated member 12 adjacent to the second end 16 which is sized to receive a hook 84 to hang the elongated member 12 on the hook 84.

Referring to FIGS. 1-4 and 9, the elongated member 12 of one embodiment of the wrench 76 extension apparatus 10 has a tubular shape, and the channel 18 is defined by an exterior wall 38 of the elongated member 12. The channel 18 of this embodiment has a cylindrical shape. The first end portion 26 of the opening 24 has a first bounding edge 40 and a second bounding edge 42. The first bounding edge 40 has a longitudinal portion 44 and a transverse portion 46, wherein the longitudinal portion 44 extends longitudinally with respect to the elongated member 12 from the first end 14 of the elongated member 12 to the transverse portion 46 and the transverse portion 46 is oriented perpendicularly with respect to the longitudinal portion 44. The central portion 30 of the opening 24 has a first boundary edge 48 and a second boundary edge 50, wherein the first boundary edge 48 is joined to the first bounding edge 40 of the first end portion 26 of the opening 24 at a junction of the central portion 30 and the first end portion 26. The channel 18 has a chamfer edge 52 which extends between the second bounding edge 42 of the first end portion 26 and the second boundary edge 50 of the central portion 30.

Referring to FIGS. 5-8, the channel 18 of another embodiment has a first section 20 and a second section 22, wherein the first section 20 extends from the first end 14 of the elongated member 12 to the second section 22 and the second section 22 extends from the first section 20 to the second end 16 of the elongated member 12. The first section 20 has a rectangular cuboid shape, and the second section 22 has a cylindrical shape. The first end portion 26 of the opening 24 has a first bounding surface 54 and a second bounding surface 56. The first bounding surface 54 has a longitudinal portion 58 and a transverse portion 60, wherein the longitudinal portion 58 extends longitudinally with respect to the elongated member 12 from the first end 14 of the elongated member 12 to the transverse portion 60 and the transverse portion 60 is oriented perpendicularly with respect to the longitudinal portion 58.

The central portion 30 of the opening 24 of this other embodiment has a first boundary surface 62 and a second boundary surface 64. The first boundary surface 62 is joined to the first bounding surface 54 of the first end portion 26 of the opening 24 at a junction of the central portion 30 and the first end portion 26. The second boundary surface 64 is joined to the second bounding surface 56 of the first end portion 26 of the opening 24 at the junction of the central portion 30 and the first end portion 26. The second end portion 28 of the opening 24 has a first delimiting surface 66 and a second delimiting surface 68, wherein the first delimiting surface 66 extends from the first boundary surface 62 of the central portion 30 of the opening 24 to a terminal end 70 of the second end portion 28 of the opening 24. The second delimiting surface 68 has a longitudinal segment 72 and a transverse segment 74, wherein the longitudinal segment 72 extends longitudinally with respect to the elongated member 12 from the terminal end 70 of the second end portion 28 to the central portion 30 and the transverse segment 74 is oriented perpendicularly with respect to the longitudinal segment 72.

In use, the wrench 76 is inserted into the channel 18 as described above. The opening 24 of either embodiment described is shaped to insert the wrench 76 in two stages. First, the central section 78 of the wrench 76 is inserted into the channel 18 through the central portion 30 of the opening 24 of the elongated member 12. Second, the wrench 76 is twisted to insert the opposing end portions of the wrench 76 through the first end portion 26 and the second end portion 28 of the opening 24. The shape of the opening 24 facilitates a more ergonomic insertion of the wrench 76 than in similar designs wherein the opening 24 is curved such that the wrench 76 must be simultaneously inserted and twisted. After inserting the wrench 76 in this manner, the wrench 76 extends out of the channel 18 through the first end 14 of the extension member. The wrench 76 is positioned around a rotatable member 82 such as a bolt, and the extension member is gripped and rotated to cause the wrench 76 to rotate the rotatable member 82.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wrench extension apparatus comprising:

an elongated member having a first end and a second end, the elongated member defining a channel therein which is open on the first end, the channel having a size such that the channel is configured for partially containing a wrench, the elongated member having an opening having a size such that the opening is configured for receiving the wrench into the channel, the opening having a first end portion, a second end portion, and a central portion, the first end portion of the opening extending from the first end of the elongated member toward the second end of the elongated member along a first side of the elongated member, the central portion of the opening extending from the first end portion around the elongated member to a second side of the elongated member opposite the first side, the second end portion of the opening extending from the central portion toward the second end of the elongated member, the opening being shaped such that the opening is configured to facilitate insertion of a central section of the wrench through the central portion of the opening and thereafter facilitate insertion of opposing end sections of the wrench through respective ones of the first end portion and the second end portion of the opening; and wherein the central portion of the opening is positioned closer to the first end of the elongated member than the second end.

2. The apparatus of claim 1, wherein the central portion is oriented to form an acute angle with a central longitudinal axis of the elongated member.

3. The apparatus of claim 1, wherein the elongated member has a mounting hole extending into the elongated member adjacent to the second end, the mounting hole having a size such that the mounting hole is configured to receive a hook to hang the elongated member on the hook.

4. The apparatus of claim 1, wherein the elongated member has a tubular shape, the channel being defined by an exterior wall of the elongated member, the channel having a cylindrical shape.

5. A wrench extension apparatus comprising:

an elongated member having a first end and a second end, the elongated member defining a channel therein which is open on the first end, the channel having a size such that the channel is configured for partially containing a wrench, the elongated member having an opening having a size such that the opening is configured for receiving the wrench into the channel, the opening having a first end portion, a second end portion, and a central portion, the first end portion of the opening extending from the first end of the elongated member toward the second end of the elongated member along a first side of the elongated member, the central portion of the opening extending from the first end portion around the elongated member to a second side of the elongated member opposite the first side, the second end portion of the opening extending from the central portion toward the second end of the elongated member, the opening being shaped such that the opening is configured to facilitate insertion of a central section of the wrench through the central portion of the opening and thereafter facilitate insertion of opposing end sections of the wrench through respective ones of the first end portion and the second end portion of the opening; and wherein the second end portion of the opening is longer than the first end portion.

6. A wrench extension apparatus comprising:

an elongated member having a first end and a second end, the elongated member defining a channel therein which is open on the first end, the channel having a size such that the channel is configured for partially containing a wrench, the elongated member having an opening having a size such that the opening is configured for receiving the wrench into the channel, the opening having a first end portion, a second end portion, and a central portion, the first end portion of the opening extending from the first end of the elongated member toward the second end of the elongated member along a first side of the elongated member, the central portion of the opening extending from the first end portion around the elongated member to a second side of the elongated member opposite the first side, the second end portion of the opening extending from the central portion toward the second end of the elongated member, the opening being shaped such that the opening is configured to facilitate insertion of a central section of the wrench through the central portion of the opening and thereafter facilitate insertion of opposing end sections of the wrench through respective ones of the first end portion and the second end portion of the opening;

wherein the elongated member has a tubular shape, the channel being defined by an exterior wall of the elongated member, the channel having a cylindrical shape; and wherein the first end portion of the opening has a first bounding edge and a second bounding edge, the first bounding edge having a longitudinal portion and a transverse portion, the longitudinal portion extending longitudinally with respect to the elongated member from the first end of the elongated member to the transverse portion, the transverse portion being oriented perpendicularly with respect to the longitudinal portion.

7. The apparatus of claim 6, wherein the central portion of the opening has a first boundary edge and a second boundary edge, the first boundary edge being joined to the first bounding edge of the first end portion of the opening at a junction of the central portion and the first end portion, the channel having a chamfer edge extending between the second bounding edge of the first end portion and the second boundary edge of the central portion.

8. A wrench extension apparatus comprising:

an elongated member having a first end and a second end, the elongated member defining a channel therein which is open on the first end, the channel having a size such that the channel is configured for partially containing a wrench, the elongated member having an opening having a size such that the opening is configured for receiving the wrench into the channel, the opening having a first end portion, a second end portion, and a central portion, the first end portion of the opening extending from the first end of the elongated member toward the second end of the elongated member along a first side of the elongated member, the central portion of the opening extending from the first end portion around the elongated member to a second side of the elongated member opposite the first side, the second end portion of the opening extending from the central portion toward the second end of the elongated member, the opening being shaped such that the opening is configured to facilitate insertion of a central section of the wrench through the central portion of the opening and thereafter facilitate insertion of opposing end sections of the wrench through respective ones of the first end portion and the second end portion of the opening; and wherein the channel has a first section and a second section, the first section extending from the first end of the elongated member to the second section, the second section extending from the first section to the second end of the elongated member, the first section having a rectangular cuboid shape, the second section having a cylindrical shape.

9. The apparatus of claim 8, wherein the first end portion of the opening has a first bounding surface and a second bounding surface, the first bounding surface having a longitudinal portion and a transverse portion, the longitudinal portion extending longitudinally with respect to the elongated member from the first end of the elongated member to the transverse portion, the transverse portion being oriented perpendicularly with respect to the longitudinal portion.

10. The apparatus of claim 9, wherein:

the central portion of the opening has a first boundary surface and a second boundary surface, the first boundary surface being joined to the first bounding surface of the first end portion of the opening at a junction of the central portion and the first end portion, the second boundary surface being joined to the second bounding surface of the first end portion of the opening at the junction of the central portion and the first end portion; and the second end portion of the opening has a first delimiting surface and a second delimiting surface, the first delimiting surface extending from the first boundary surface of the central portion of the opening to a terminal end of the second end portion of the opening, the second delimiting surface having a longitudinal segment and a transverse segment, the longitudinal segment extending longitudinally with respect to the elongated member from the terminal end of the second end portion to the central portion, the transverse segment being oriented perpendicularly with respect to the longitudinal segment.

11. A wrench extension apparatus comprising an elongated member having a first end and a second end, the elongated member defining a channel therein which is open on the first end and the second end of the elongated member, the channel having a size such that the channel is configured for partially containing a wrench, the elongated member having an opening having a size such that the opening is configured for receiving the wrench into the channel, the opening having a first end portion, a second end portion, and a central portion, the first end portion of the opening extending from the first end of the elongated member toward the second end of the elongated member along a first side of the elongated member, the central portion of the opening extending from the first end portion around the elongated member to a second side of the elongated member opposite the first side, the second end portion of the opening extending from the central portion toward the second end of the elongated member, the central portion being oriented to form an acute angle with a central longitudinal axis of the elongated member, the opening being shaped such that the opening is configured to facilitate insertion of a central section of the wrench through the central portion of the opening and thereafter facilitate insertion of opposing end sections of the wrench through respective ones of the first end portion and the second end portion of the opening, the central portion of the opening being positioned closer to the first end of the elongated member than the second end, the second end portion of the opening being longer than the first end portion, the elongated member having a mounting hole extending into the elongated member adjacent to the second end, the mounting hole having a size such that the mounting hole is configured to receive a hook to hang the elongated member on the hook.

12. The apparatus of claim 11, wherein:

the elongated member has a tubular shape, the channel being defined by an exterior wall of the elongated member, the channel having a cylindrical shape;

the first end portion of the opening has a first bounding edge and a second bounding edge, the first bounding edge having a longitudinal portion and a transverse portion, the longitudinal portion extending longitudinally with respect to the elongated member from the first end of the elongated member to the transverse portion, the transverse portion being oriented perpendicularly with respect to the longitudinal portion; and the central portion of the opening has a first boundary edge and a second boundary edge, the first boundary edge being joined to the first bounding edge of the first end portion of the opening at a junction of the central portion and the first end portion, the channel having a chamfer edge extending between the second bounding edge of the first end portion and the second boundary edge of the central portion.

13. The apparatus of claim 11, wherein:

the channel has a first section and a second section, the first section extending from the first end of the elongated member to the second section, the second section extending from the first section to the second end of the elongated member, the first section having a rectangular cuboid shape, the second section having a cylindrical shape;

the first end portion of the opening has a first bounding surface and a second bounding surface, the first bounding surface having a longitudinal portion and a transverse portion, the longitudinal portion extending longitudinally with respect to the elongated member from the first end of the elongated member to the transverse portion, the transverse portion being oriented perpendicularly with respect to the longitudinal portion;

the central portion of the opening has a first boundary surface and a second boundary surface, the first boundary surface being joined to the first bounding surface of the first end portion of the opening at a junction of the central portion and the first end portion, the second boundary surface being joined to the second bounding surface of the first end portion of the opening at the junction of the central portion and the first end portion; and the second end portion of the opening has a first delimiting surface and a second delimiting surface, the first delimiting surface extending from the first boundary surface of the central portion of the opening to a terminal end of the second end portion of the opening, the second delimiting surface having a longitudinal segment and a transverse segment, the longitudinal segment extending longitudinally with respect to the elongated member from the terminal end of the second end portion to the central portion, the transverse segment being oriented perpendicularly with respect to the longitudinal segment.

* * * * *